(12) United States Patent
Wu et al.

(10) Patent No.: US 6,942,507 B1
(45) Date of Patent: Sep. 13, 2005

(54) CARD READER STRUCTURE

(75) Inventors: Kuo-Chuan Wu, Taipei (TW); Tun-Jen Chen, Taipei (TW); Ming-Jen Liu, Taipei (TW); Wen-Ping Chang, Taipei (TW)

(73) Assignee: Asour Technology Inc., Taipei (TW)

( * ) Notice: Subject to any disclaimer, the term of this patent is extended or adjusted under 35 U.S.C. 154(b) by 0 days.

(21) Appl. No.: 11/020,334

(22) Filed: Dec. 27, 2004

(51) Int. Cl.⁷ .............................................. H01R 13/62
(52) U.S. Cl. ..................................................... 439/159
(58) Field of Search ................................ 439/159, 160, 439/188

(56) References Cited

U.S. PATENT DOCUMENTS 5,741,632 A * 4/1998 Kiekens ...................... 430/522
6,406,312 B1 * 6/2002 Heitkamp .................... 439/160
6,736,656 B1 * 5/2004 Yu .............................. 439/159
6,761,569 B2 * 7/2004 Nakamura ................... 439/159

* cited by examiner

*Primary Examiner*—Briggette R. Hammond
*Assistant Examiner*—James R. Harvey
(74) *Attorney, Agent, or Firm*—Leong C. Lei

(57) ABSTRACT

An improved structure of a card reader is provided, which comprises of a sideway card ejection switch and a sliding housing. The sideway card ejection switch and the sliding housing structure that can reduce the component count to minimize the production cost. In addition, by improving the robustness of the structure, the reliability of the card reader is increased leading to the ultimate goal of extending its operation life.

1 Claim, 5 Drawing Sheets

CARD READER STRUCTURE

BACKGROUND OF THE INVENTION (a) Technical Field of the Invention

The present invention generally relates to card reader, and more particularly to a simplified, highly efficient, and easy to operate mechanism for the structure of a removable card reader.

(b) Description of the Prior Art

Existing card reader and memory card housing focus on features like miniaturizing and holding multiple cards but lack innovation and breakthrough in design. The only objective of these designs is for card insertion, and consequently no other structural considerations are taken. However, newer consumer electronics products are coming out almost daily such as desktop PC, digital camera, notebook, and PDA. Memory cards play a vital role in these 3C products, and more importantly, the grade of a memory card definitely differentiates the level of usefulness of these products. On the other hand, the consumers' criteria in selecting products are always thin, miniaturizing, light weight, easy to insert, and robust. Consequently, these features are also what every manufacturer is striving for.

A typical structure of a card reader designed with prior art is shown in FIG. 1.

The card reader includes an outside cover D1, a sliding housing D2, a card ejection button D3, which make up the whole body of the card reader. The sliding housing D2 comprises of a bottom catching seat D21 and a sliding seat D22; the bottom catching seat D21 is installed at the bottom of outside cover D1 and it has a sliding slot to provide a back and forth movement for the sliding seat D22 which has a bending extension. At the back of the sliding housing D2 there is a tension spring D23 at the center position providing the force for pushing back the sliding housing D2. On one side of the front panel of outside cover D1 there is a card ejection button D3. With a forward pressing force, the card ejection button D3 makes the tenon D31 go backward horizontally. As a result, the tenon D31 will break when the card reader's position is incorrect or after the tenon D31 itself has undergone wearing and tearing. These are the two major disadvantages of these insertion-type card readers. The disadvantages of prior art are what this invention will address as well. They can be listed as following:

First, both the sliding housing D2 and the card ejection button D3 take a lot of components. These components make no contribution to the structural soundness; they merely increase the final product's cost and are detrimental to its quality.

Secondly, the additional components also make the product longer to assemble and create a production bottleneck. Additional assembly steps also increase the chance of producing poor quality products.

Thirdly, the poor design of the card ejection button D3 in prior art causes the ejecting card to hit the operator's hand. The complex design of prior design also increases the number of failure during its life span.

SUMMARY OF THE INVENTION

The primary purpose of the present invention is to provide an improved structure of a card reader, which mainly comprises a sideway card ejection switch and a sliding housing.

The design objective of the sideway card ejection switch is to eject a card sideways with a sliding switch. This improved mode of operation can avoid the problem of the card hitting the hand of the operator while being ejected. In addition, this design simplifies the structure of the card reader and improves its reliability. Most importantly, the design reduces the cost of components used which increases the product's competitiveness on the market.

The design objective of the sliding housing is to use the simplest sliding structure to accomplish the function and pays special attention to the force for accurate positioning of the card reader to avoid both displacement of housing and its off-center movement in the sliding path. The final structure works in conjunction with the sideway card ejection switch. Both reinforce each other to enhance overall structure of the card reader.

In this invention, the main mechanical structure includes the outside cover, the sliding housing, and the sideway card ejection switch. The sliding housing is made of a one-piece plastic injection molding body. There are two sliding slots with built-in holding components at the bottom of this housing. The housing can move back and forth within the specified range with a built-in back spring action. The sliding range of the housing is equivalent to the distance the removable card reader's body travels. When the housing moves inward, it presses the tension spring at the back and attaches itself to the card reader's body through the ejection switch's locking mechanism. This mechanism fixes the position of both the housing and the reader. When the operator pushes the sliding ejection switch sideways, the card reader is released, and the back tension spring will move the housing forward together with the card reader.

From the description of the mechanical structure and associated operational characteristics, the sideway card ejection switch can indeed accomplishes mechanisms of both insertion and releasing. It avoids the problem of the card hitting the hand of the operator during ejection at the same time.

Based on what is said above, the present invention can correct all the disadvantages of prior art. The sliding housing design reduces the two-part structure of prior art into a single construction in serving the same function. The sideway card ejection switch also reduces parts count to achieve lower cost, reliable structure, and easy operation.

The foregoing object and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are of exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
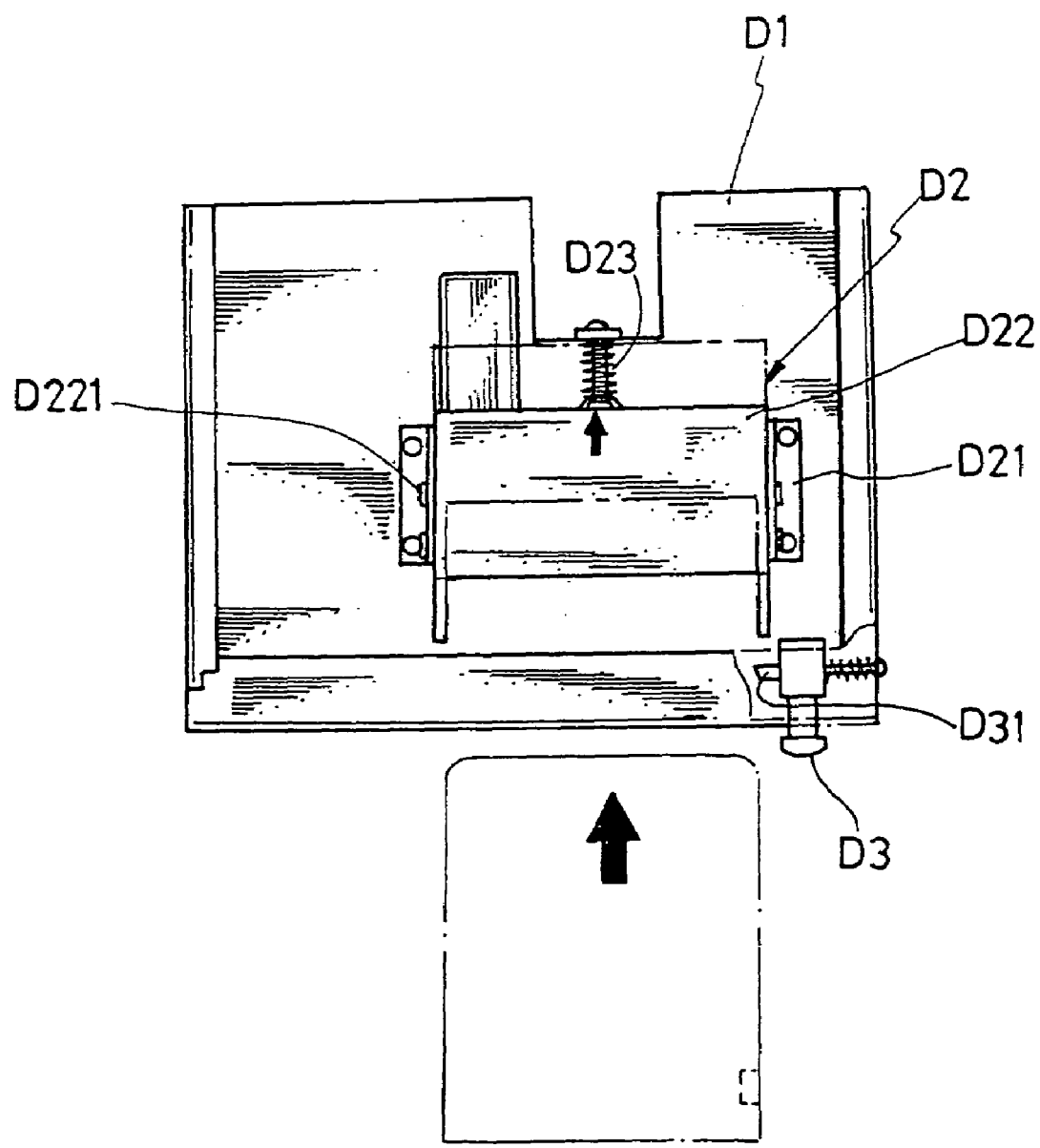
FIG. 1 is a two-dimensional perspective view of a card reader with prior art.
Figure 2:
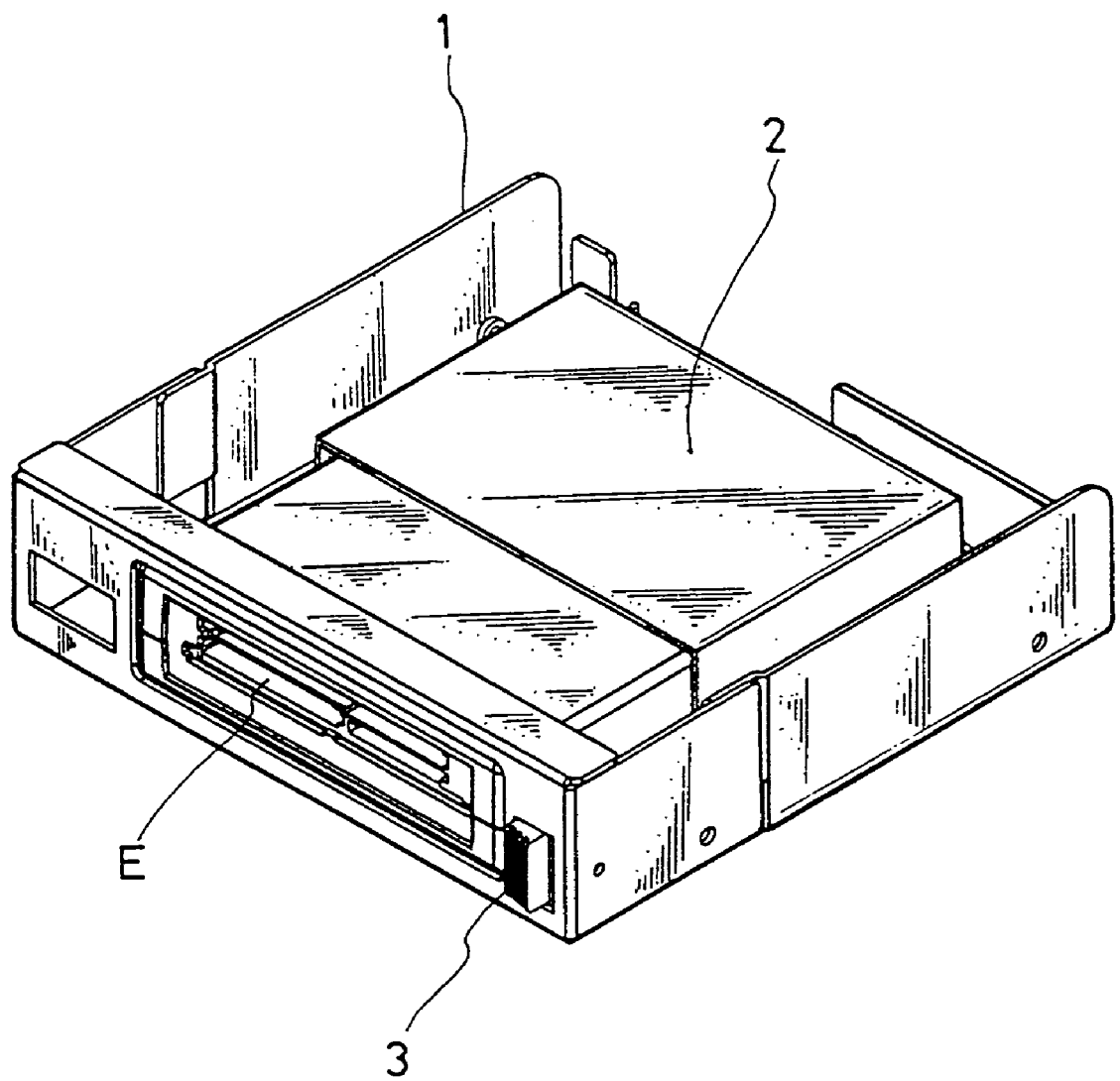
FIG. 2 is a three-dimensional view of an embodiment of the present invention.
Figure 3:
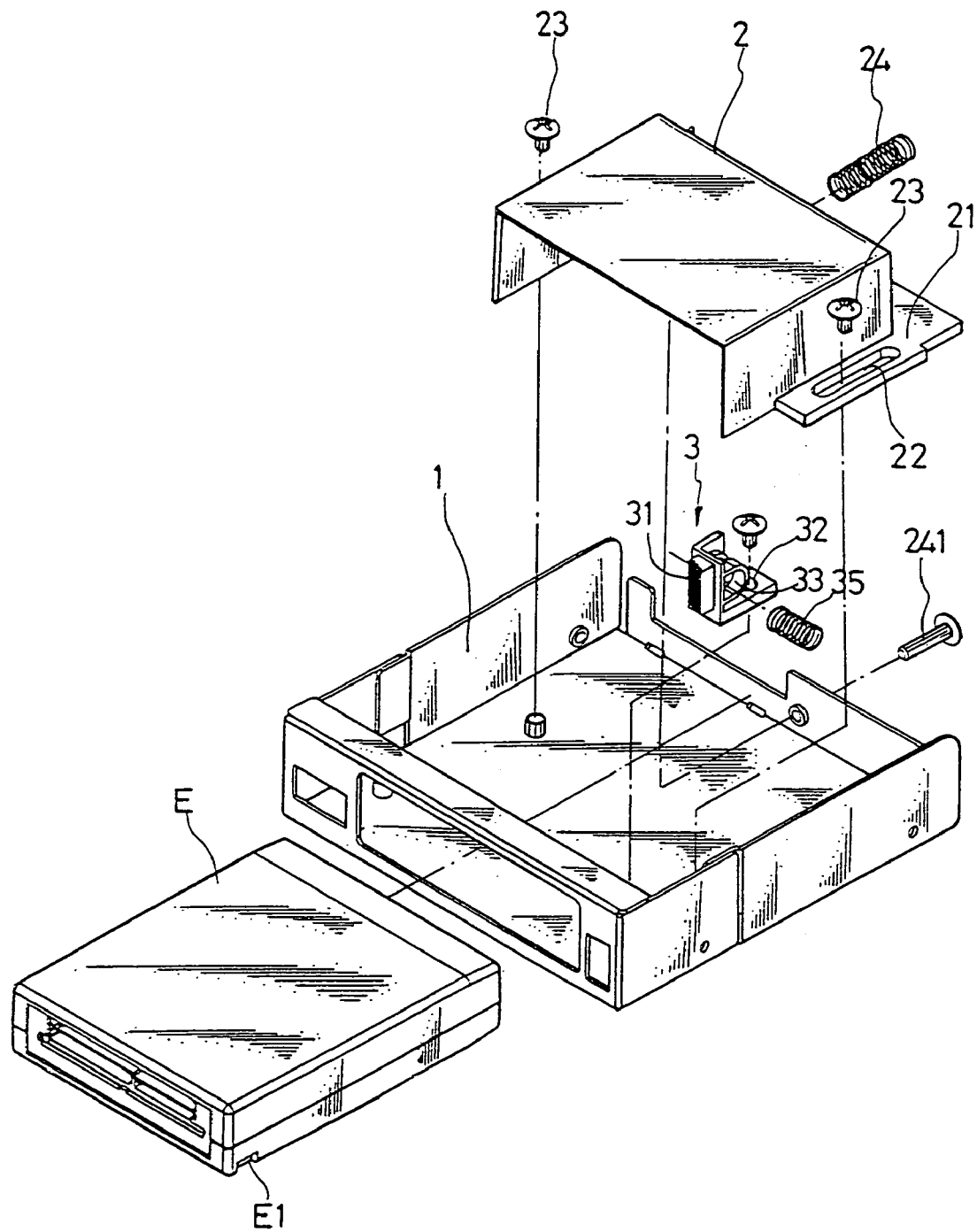
FIG. 3 is a sectional structure view of an embodiment of the present invention.

As shown in FIG. 2 and FIG. 3, an embodiment of the present invention comprises an outside cover 1, a sliding housing 2, and a sideway card ejection switch 3. The sliding housing 2 further comprises of a bending flat surface 21, and at the top of this flat surface 21 two sliding slots 22 are opened symmetrically on each side. These sliding slots 22 are restricted by two tenons 23 installed on the outside cover 1 enabling the sliding housing 2 to move back and forth under the guidance of the tenons 23 along the designated path.

Figure 4:
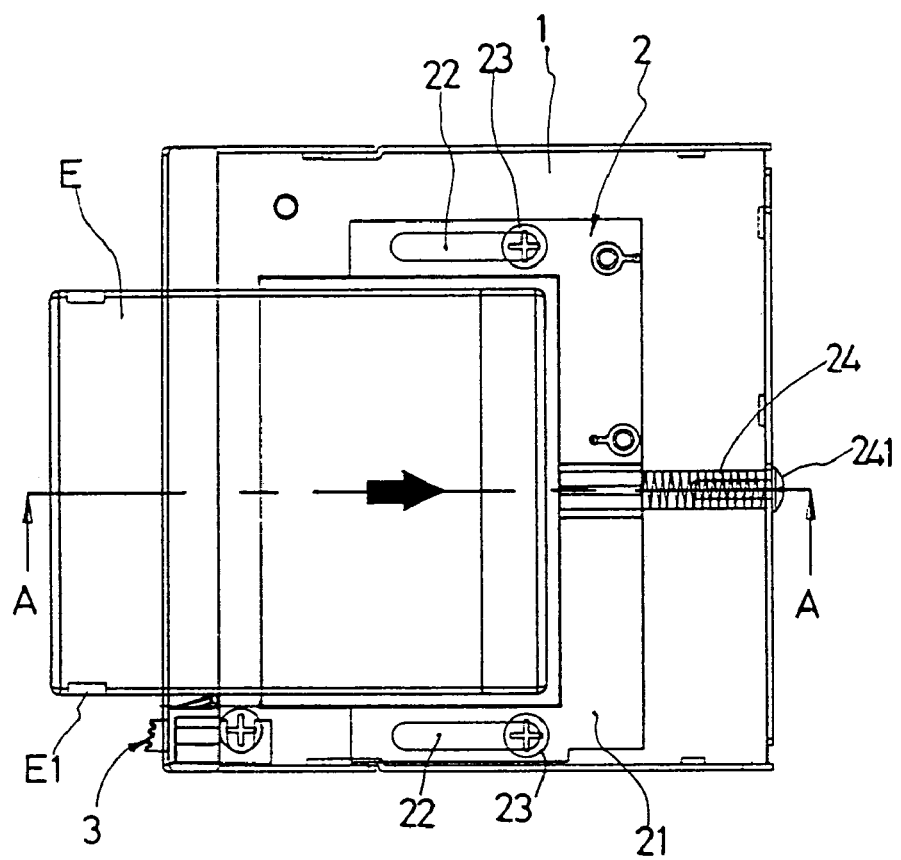
FIG. 4 is a perspective view showing movement (including a cross-sectional structure view of A—A) of an embodiment of the present invention.
Figure 5:
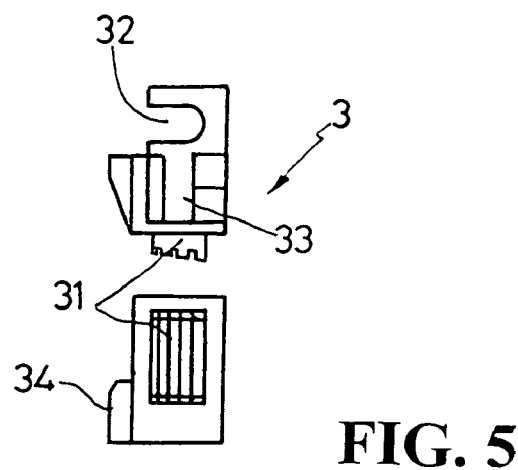
FIG. 5 is a two-dimensional perspective view showing the sideway card ejection switch of an embodiment of the present invention.
Figure 6:
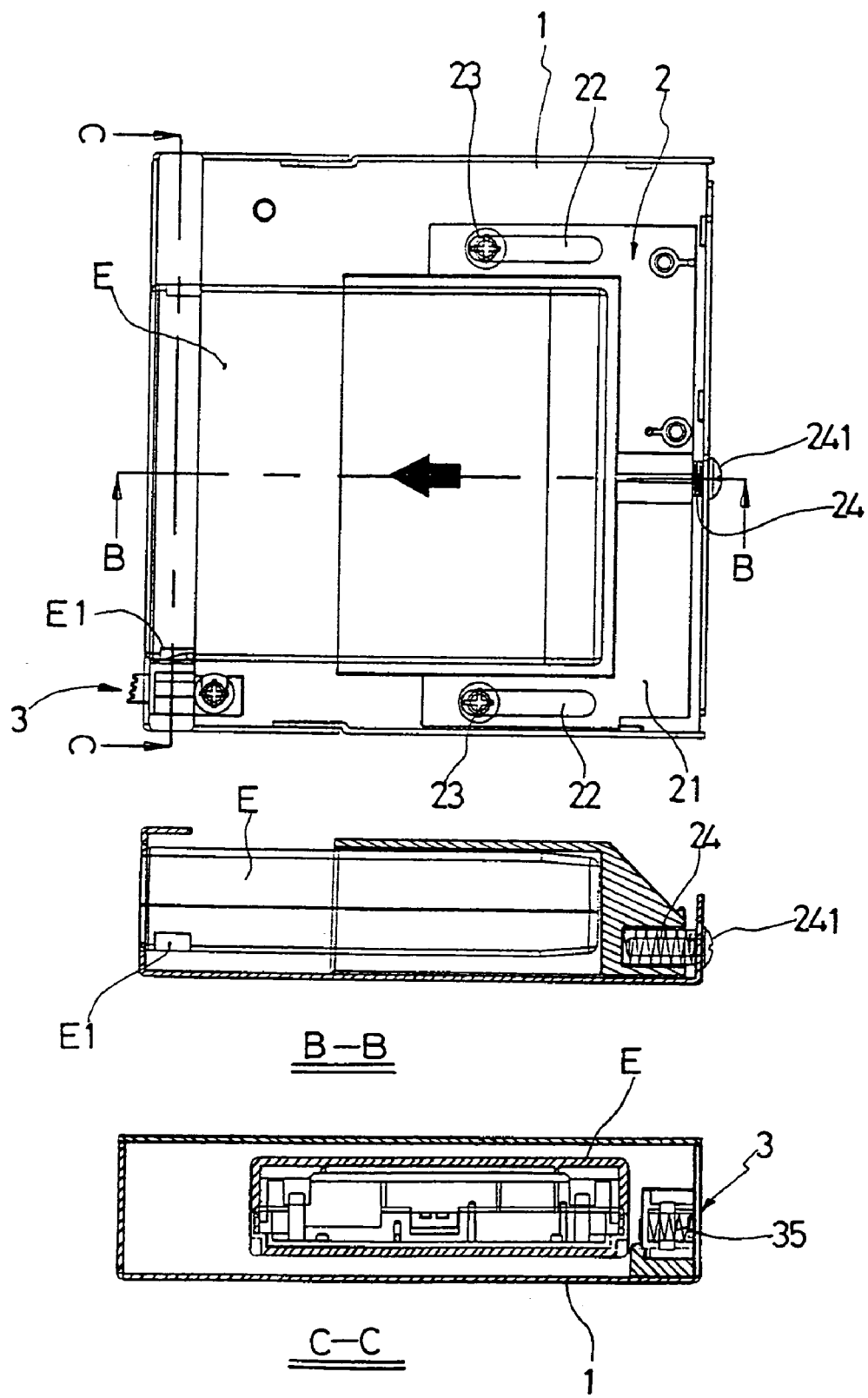
FIG. 6 is a perspective view showing movement (including a cross-sectional structure view of B—B and C—C) of an embodiment of the present invention.

As show in FIG. 4, at the back of the sliding housing 2, there is a tension spring 24 which is fixed in position with a spring holder 241. The tension spring 24 can therefore presses on the sliding housing 2 with its tension force. FIG. 5 shows the sideway card ejection switch as a one-piece construction. It features a sideway protrusion block structure 31, a tenon-slot structure 32, a built-in spring ring structure 33, and a card locking block structure 34. The sideway protrusion block structure 31 is at the front of the sideway card ejection switch 3, enabling operator to slide the switch sideways. The tenon-slot structure 32 is at the back side of the sideway card ejection switch 3. Its slot is restricted by the tenon 23 attached to the outside cover 1. This design enables the card ejection switch 3 to move sideways according to the relative position of the slot and the tenon 23. The built-in spring ring structure 33 is placed at the back inside the sideway protrusion block structure 31, forming a ring structure to accept the tension spring 35 which is completely restricted by the built-in spring ring structure 33. The card locking block structure 34 is on one side of the sideway card ejection switch 3. It is tilted and can be used with a standard slot E1 on the body of the removable card reader E to hold a card as shown in FIG. 3 and FIG. 6.

As shown in FIG. 4 and FIG. 5, the sliding range of the sliding housing 2 is equivalent to the distance traveled by the removable card reader's body E.

When the housing 2 moves inward, it presses the tension spring 24 at the back and attaches itself to the card slot E1 at the card reader's body E through the locking mechanism of the ejection switch 3. To remove a card, pressing the sliding ejection switch 3 sideways will release the card reader's body E from the ejection switch 3. A forward pressing force from the tension spring 24 will push the card reader's body E out. Operator can now remove the card.

With this foregoing description we have shown that the present invention is indeed a superior design comparing to the prior art. It is a simplified, innovative, design with improved functionality.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

We claim:

1. An improved structure of a card reader comprising an outside cover, a sliding housing, and a sideway card ejection switch, said improved structure of said card reader characterized in that said sliding housing is made of a one-piece plastic injection molding body, a bending flat surface and two sliding slots with built-in holding components are at a bottom of said sliding housing enabling said sliding housing to move back and forth, a built-in tension spring with a holder is at the back of said sliding housing whose force positions both said sliding housing and said card reader, said sideway card ejection switch is a one-piece construction comprising a sideway protrusion block structure, a tenon-slot structure, a built-in spring ring structure, and a card locking block structure, said sideway protrusion block structure is at the front of said sideway card ejection switch, said tenon-slot structure is at the back side of said sideway card ejection switch whose slot is restricted by a tenon attached to said outside cover, enabling said sideway card ejection switch to move sideways according to the relative position of said slot and said tenon, said built-in spring ring structure is placed at the back inside said sideway protrusion block structure, forming a ring structure to take said built-in tension spring which is completely restricted by said built-in spring ring structure, said card locking block structure is on one side of said sideway card ejection switch, which is tilted and is used with a standard slot on the body of said card reader to hold a card.

* * * * *